United States Patent
Rosenberg

[11] Patent Number: 5,988,245
[45] Date of Patent: Nov. 23, 1999

[54] VEHICLE WHEEL ASSEMBLIES INCLUDING PROTECTION AGAINST EXCESSIVE TIRE PRESSURE

[76] Inventor: Gideon Rosenberg, 20 Ana Senesh, 36000 Tiveon, Israel

[21] Appl. No.: 08/904,935

[22] Filed: Aug. 1, 1997

Related U.S. Application Data

[60] Provisional application No. 60/024,677, Aug. 7, 1996.

[51] Int. Cl.⁶ ................................. B60C 23/10
[52] U.S. Cl. .................. 152/427; 152/429; 137/228; 137/230; 137/226; 137/523; 137/137
[58] Field of Search ................... 152/427, 429, 152/415; 137/228, 230, 226, 523, 860

[56] References Cited

U.S. PATENT DOCUMENTS

| | | | |
|---|---|---|---|
| 1,246,131 | 11/1917 | Marston | 137/226 |
| 2,501,937 | 3/1950 | Gramelspacher | 301/429 |
| 2,512,766 | 6/1950 | Caldwell | 137/226 |
| 2,671,466 | 3/1954 | Conrad | 137/860 |
| 3,618,690 | 11/1971 | Johnson | 137/860 |
| 3,911,988 | 10/1975 | Richards | 152/427 |
| 3,994,312 | 11/1976 | Tanner et al. | 137/226 |
| 4,151,863 | 5/1979 | Stevens et al. | 137/230 |
| 4,153,096 | 5/1979 | Kirk | 152/415 |
| 4,237,935 | 12/1980 | Delmonte et al. | 137/860 |
| 4,283,991 | 8/1981 | Gaun et al. | 137/860 |
| 4,445,527 | 5/1984 | Leimbach | 137/226 |
| 4,660,590 | 4/1987 | Sanchez | 137/226 |
| 4,681,148 | 7/1987 | Decker, Jr. et al. | 152/431 |
| 4,883,107 | 11/1989 | Keys | 152/431 |
| 5,181,977 | 1/1993 | Gneiding et al. | 152/429 |
| 5,665,908 | 9/1997 | Burkey et al. | 137/228 |
| 5,762,103 | 6/1998 | Gregoire | 137/860 |

*Primary Examiner*—D. Glenn Daydan
*Assistant Examiner*—Long Bao Nguyen
*Attorney, Agent, or Firm*—Mark M. Friedman

[57] ABSTRACT

A vehicle wheel assembly includes a tire, a rim, an air valve and a relief valve. The relief valve can be installed in the rim, in the tire, or incorporated into the housing of the air valve to communicate directly with the interior of the tire; or as an adapter attachable to the outer end of the air valve. The relief valve includes an aperture normally covered by pre-stressed flexible belt which seals the aperture, but upon the presence of excessive pressure in the tire is deforming to vent the excessive pressure to the atmosphere. A second described variation relief valve includes a weakened portion of its housing which is automatically ruptured upon the presence of excessive pressure; this variation provides a one-time venting adapter.

1 Claim, 4 Drawing Sheets

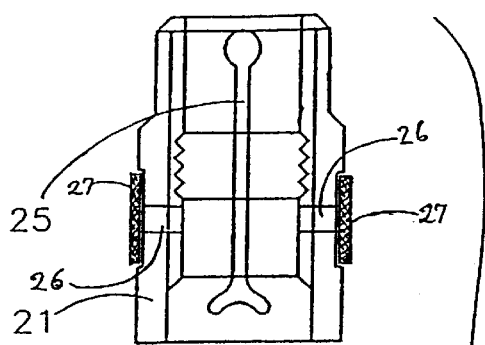
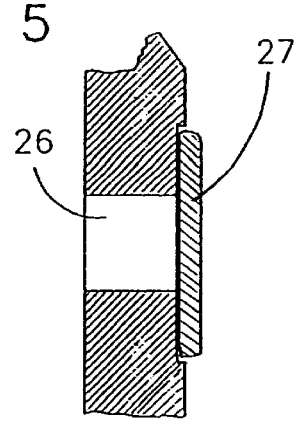
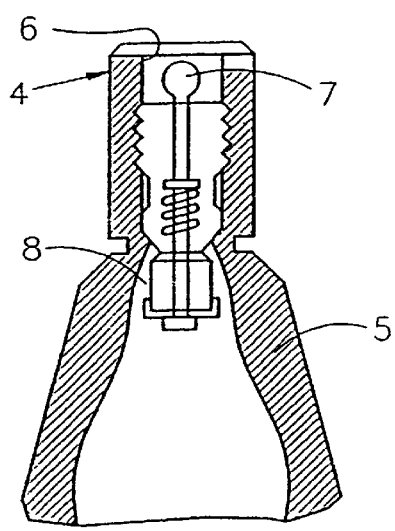
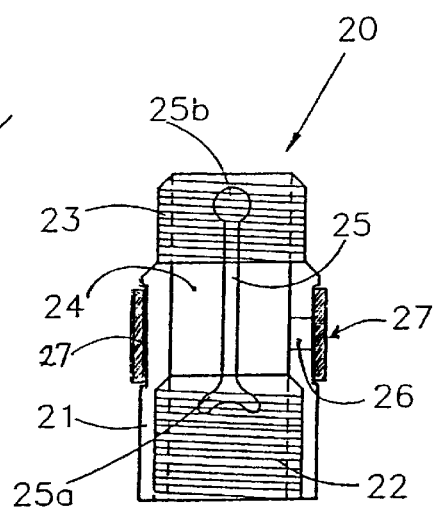
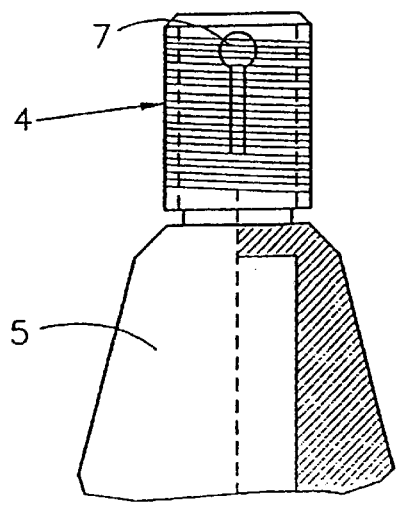
FIG. 5
FIG. 4
FIG. 3

VEHICLE WHEEL ASSEMBLIES INCLUDING PROTECTION AGAINST EXCESSIVE TIRE PRESSURE

This Appln. claims the benefit of U.S. Provisional Appln. 60/024,677, filed Aug. 7, 1996.

FIELD AND BACKGROUND OF THE INVENTION

The present invention relates to vehicle wheel assemblies, and particularly to such assemblies which are provided with protection against excessive pressure in the vehicle tire.

Vehicle tires are designed to be pressurized at a predetermined air pressure according to the type of vehicle. Thus, the optimum pressure of the vehicle tire may range from about 26 PSI for passenger vehicles, up to about 125 PSI for heavy trucks. Air pressure pumps provided in service stations for adding pressurized air to a vehicle tire are therefore generally capable of pressurizing the tire well over 125 PSI.

Such air pressure pumps frequently include pressure meters which indicate the pressure of the vehicle tire being inflated, but generally include presettable pressure limiters which enable the user to preset the maximum pressures to be applied to the tire. However, if such a pressure limiter should malfunction, a very dangerous situation can be created where a vehicle tire, designed for e.g., 26 PSI, may be filled to a pressure of over 100 PSI. This may result in the bursting of the tire which can cause very serious injury to the person filling the tire particularly since the person's head is generally close to the tire being filled. In fact, there have been a number of cases of tire bursting resulting in serious injury, or even death, to the person filling the tire.

OBJECT AND BRIEF SUMMARY OF THE INVENTION

An object of the present invention is to provide a vehicle wheel assembly which provides protection against excessive tire pressure in a tire when being filled.

According to the present invention, there is provided a vehicle wheel assembly, comprising: a tire rim; an inflatable tire on the rim; an air valve connectable to a source of pressurized air for inflating the tire with pressurized air; and a relief valve communicating with the interior of the tire, the relief valve normally being closed but being automatically opened upon the presence of an excessive pressure within the tire to vent the interior of the tire or the source of pressurized air to the atmosphere.

The invention is described below with respect to several preferred embodiments.

According to one preferred embodiment, the air valve is in an air valve housing mounted at one location on the rim to communicate directly with the interior of the tire, and the relief valve includes a relief valve housing mounted at another location on the rim also to communicate directly with the interior of the tire in parallel to the air valve.

According to a second described embodiment, the relief valve is in the form of an adapter attachable to the outer end of the air valve to automatically vent the source of pressurized air to the atmosphere upon the presence of an excessive pressure within the tire.

More particularly, in the latter described embodiment, the adapter includes an adapter housing having a socket at one end for receiving the outer end of the air valve, a socket at the opposite end for receiving the head of an air line connected to the source of pressurized air, and a chamber connecting the two sockets. The adapter further includes a pin in the chamber having one end engageable with the head of the air line, and an opposite end engageable with a stem of the air valve. The pin is movable axially of the chamber such that when the head of the air line engages the one end of the pin, it causes the opposite end of the pin to move the stem of the air valve to its open position and thereby to connect the interior of the chamber to the interior of the tire. A vent in the chamber is normally closed but is automatically opened upon the presence of an excessive pressure within the chamber to thereby vent the chamber to the atmosphere.

According to one described variation of the latter embodiment, the vent includes an opening normally covered by a flexible belt which is automatically deforming upon the presence of the excessive pressure. In a second described variation, the vent includes a weakened portion of the housing which is automatically ruptured upon the presence of the excessive pressure.

According to a still further described embodiment, the relief valve is mounted directly on the housing of the air valve and communicating with a passageway at the end of the air valve open to the interior of the tire.

According to still further described embodiments, the relief valve is mounted in the tire itself and includes a valve member which is normally by elastic material pre-stressed to a closed position but which automatically moves to an open position upon the presence of excessive pressure within the interior of the tire to thereby release the excessive pressure from the interior of the tire to the atmosphere.

As will be described more particularly below, all the foregoing embodiments of the invention provide protection against over pressurizing the vehicle tire, and therefore decrease the danger of injury to a person because of a malfunction in the air pump at a service station.

Further features and advantages of the invention will be apparent from the description below.

BRIEF DESCRIPTION OF THE DRAWINGS

The invention is herein described, by way of example only, with reference to the accompanying drawings, wherein:

FIG. 3 illustrates a second form of relief valve construction in accordance with the present invention;

FIG. 4 is an exploded view of the relief valve of FIG. 3;

FIG. 5 is an enlarged fragmentary view more particularly illustrating the venting aperture in the relief valve of FIGS. 3 and 4;

DESCRIPTION OF THE PREFERRED EMBODIMENT

Figure 1:
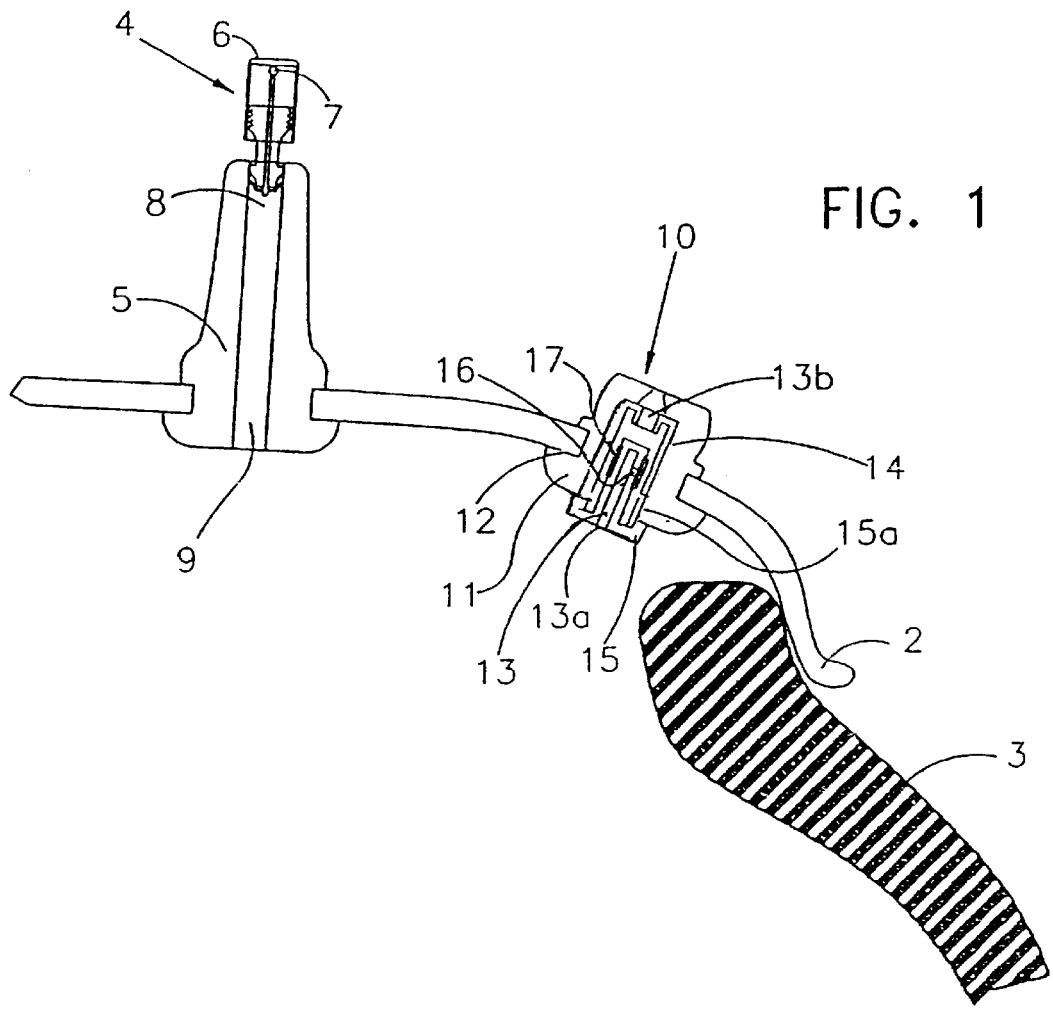
FIG. 1 illustrates one form of vehicle wheel assembly constructed in accordance with the present invention.

With reference to FIG. 1, there is illustrated a vehicle wheel assembly including a tire rim 2, an inflatable tire 3 mounted on the rim, and an air valve 4 for inflating the tire 3. Air valve 4 may be of any conventional construction, including a housing 5 mounted on the tire rim and formed at its outer end with a socket 6 for receiving the head of an air line (not shown) connected to a source of pressurized air, e.g., an air pump at a service station. Air valve 4 further includes a spring-urged stem 7 which is normally urged to close a chamber defining a passageway 8 communicating with the interior of the tire 3, but which is moved axially of housing 5 by the head of the air line, when inserted within socket 6, to open passageway 8 and thereby to connect the interior of the tire 3 to the source of pressurized air.

Since the tire rim 2, inflatable tire 3, and air valve 4 may be of any standard construction, further details of the construction and operation of these members are not set forth herein.

In order to reduce the danger of over-pressurizing the vehicle tire 3, e.g., should a malfunction occur in the presettable pressure limiter at the service station, the tire rim 2 is provided with a relief valve, generally designated 10, which is normally closed, but which automatically opens in the event of an excessive pressure within the interior of the tire.

Relief valve 10 includes a housing 11 of elastomeric material, e.g., natural or synthetic rubber, formed with an annular groove 12 for mounting the housing within a circular opening formed in the tire rim 2. Housing 11 includes a passageway 13 having one end 13a communicating with the interior of the tire 3, and the opposite end 13b communicating with the atmosphere.

Passageway 13 is defined by a chamber within a cylindrical sleeve 14 in housing 11. One end of sleeve 14 is closed by a cap 15 formed with an opening constituting the open end 13a of passageway 13. The opposite end of sleeve 14 is also formed with an opening constituting the open end 13b of passageway 13. Open end 13a of passageway 13 is normally closed by a valve member 17 seated on an opening 16 in the annular rim 15a of cap 15. The valve member 17 is made of rubber or other elastomeric material shaped as a belt of initial diameter smaller than the annular rim 15a. By placing the elastic belt over the annular rim 15a, valve 17 is tightly closing opening 16. In the event of an excessive pressure within the interior of tire 3, the force of the air pressure on the aperture 16 overcome the elastic pre-stress force of the belt 17 and the valve is automatically opened to release the excessive pressure.

Figure 2:
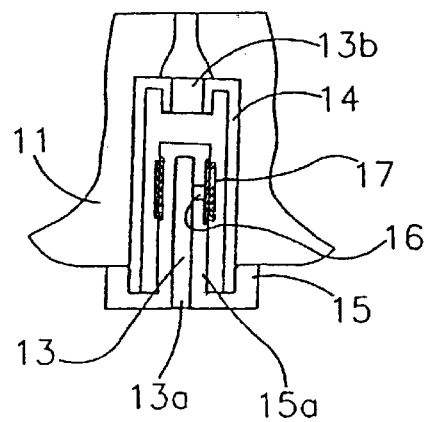
FIG. 2 is an enlarged view of the relief valve in the assembly of FIG. 1.

The vehicle wheel assembly illustrated in FIGS. 1 and 2 operates as follows:

Air valve 4 is normally used to fill the vehicle tire by receiving the head of the air line connected to the air pump (not shown), which thereby moves stem 7 of the air valve to an open position, permitting the pressurized air from the air pump to be introduced into the tire 3. During this filling of the tire, the relief valve 10 is in its closed condition, as illustrated in FIGS. 1 and 2, by the elastic force of the belt valve 17 to close opening 16 in passageway 13.

If tire 3 should be excessively pressurized, substantially more than its designed operational pressure, the excessive pressure will move valve member 17 of relief valve 10 to its open position to open passageway 13. This vents the interior of the tire to the atmosphere, thereby releasing the excessive pressure within the tire. As soon as this excessive pressure has been released, the elastic force of valve member 17 returns it to closed position.

As one example, if the vehicle tire 3 is designed for an operational pressure of 26 PSI, relief valve 10 may be designed to automatically open at a pressure of 40 PSI, well below the pressure that could possibly cause the bursting of the tire.

FIGS. 3–5 illustrate a second embodiment of the invention, wherein the relief valve is in the form of an adapter to be moaned to the conventional air valve 4 in order to protect the tire from excessive pressure.

The relief valve shown in FIGS. 3–5, and therein generally designated 20, includes a housing 21 formed with socket 22 at one end for application to the outer end of housing 5 of the air valve 4, another socket 23 at the opposite end for receiving the head of the air line connected to the air pump (not shown), and a passageway defined by chamber 24 connecting socket 22 with socket 23. Housing 21 further includes a pin 25 extending through chamber 24. One end 25a of pin 25 is engageable with the end of stem 7 in the air valve 4; and the opposite end 25b is engageable with a stem carried by the head of the airline (not shown).

Normally, the air line stem engages stem 7 of the air valve 4 to open the air valve when filling the tire with air. In this case, however, when the air line stem is applied to fill the tire, it engages pin 25 of the relief valve adapter 20 to move the air valve stem 7 via pin 25 and thereby to open the air valve for passage of the pressurized air into the tire 3.

Housing 21 of the relief valve adapter 20 is formed with an opening 26 (e.g., FIG. 5) in a side wall of the housing. This opening is normally closed by a valve 27. The valve 27 is made of rubber or other elastomeric material shaped as a belt of initial diameter smaller than the external diameter of housing 21. By placing the elastic belt over the housing, valve 27 is tightly closing opening 26. In the event of an excessive pressure within the interior of tire 3, an equal pressure fill the chamber 24 and the force of the air pressure on opening 26 overcome the elastic pre-stress force of the belt valve 27 and it automatically opens to release the excessive pressure to thereby vent the interior of chamber 24 to the atmosphere.

The relief valve illustrated in FIGS. 3–5 is applied as an adapter to a conventional air valve 4 of a vehicle wheel assembly, by inserting its socket 22 onto the outer end of housing 5 of the air valve. Housing 21 may be so applied with a friction fit to the conventional air valve. Alternatively, the conventional air valve housing may be externally threaded, as shown at 4 in FIG. 3; and socket 22 of the relief valve adapter 20 may be internally threaded, as shown at 22, in order to firmly secure the relief valve housing to the air valve.

Relief valve adapter 20, when applied to air valve 4 in the manner described above, operates as follows:

The tire is filled with air by applying the head of the air line (not shown) to socket 23, such that the stem of the air line head depresses pin 25; this depresses stem 7 of the air valve to open passageway 8 through the air valve, thereby to permit the tire to be filled with pressurized air. So long as the air pressure. within the tire is below a predetermined dangerous level, valve 27 closes opening 26 in the adapter housing 21. However, should the pressure within the tire become excessive, such as to create a danger of bursting, the force of the air pressure on opening 26 overcome the elastic pre-stress force of the belt valve 27 and it is automatically opened, thereby venting the interior of chamber 24 to the atmosphere via opening 26 to prevent any additional pressure build-up inside the tire.

Figure 6:
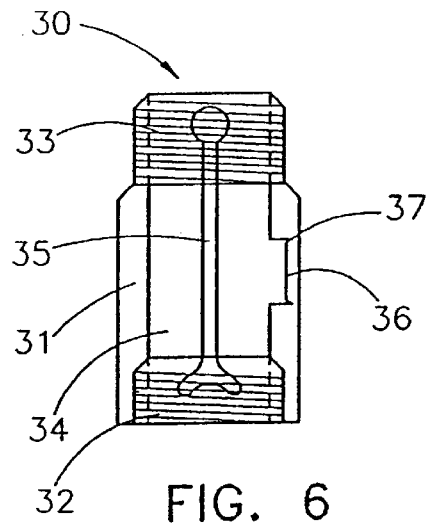
FIGS. 6, 7 and 8 are side, front and end elevational views, respectively, illustrating a variation in the construction of the relief valve of FIGS. 3 and 4.
Figure 7:
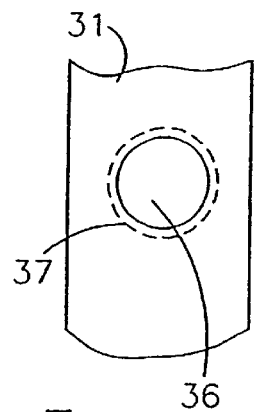
Figure 8:
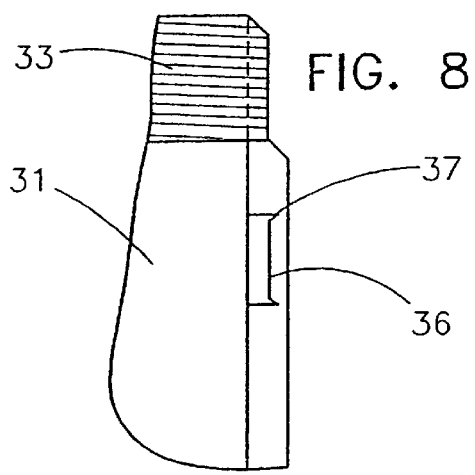

FIGS. 6–8 illustrate another one-shot construction that may be used in a relief valve adapter such as shown in FIGS. 3–5. The relief valve adapter shown in FIGS. 6–8, and therein designated 30, also includes a housing 31 having a socket 32 at one end for receiving the housing 5 of the air valve, another socket 33 at the opposite end for receiving the air line head for filling the tire, a chamber 34 connecting socket 32 to socket 33, and a pin 35 which is movable axially by the air line head (not shown), open the air valve stem 7, as described above with respect to FIGS. 3–5. In the construction illustrated in FIGS. 6–8, however, housing 31 is formed with a weakened circular portion 36, defined by an annular groove 37, such that in the event of an excessive pressure within the air tire, the weakened portion 36 ruptures along the annular groove 37 to vent the interior of chamber 34 to the atmosphere.

It will be appreciated that the constructions illustrated in FIGS. 6–8 provide a one-time venting arrangement and require replacement of the adapter after the one-time use. However, there may also be used a multi-time type of venting arrangement, including a valve member which is normally elastically urged to its closed position, but which automatically opens upon the presence of an excessive pressure to vent the interior of the tire to the atmosphere, as shown in FIGS. 1,2 and 3–5 for example.

Figure 9:
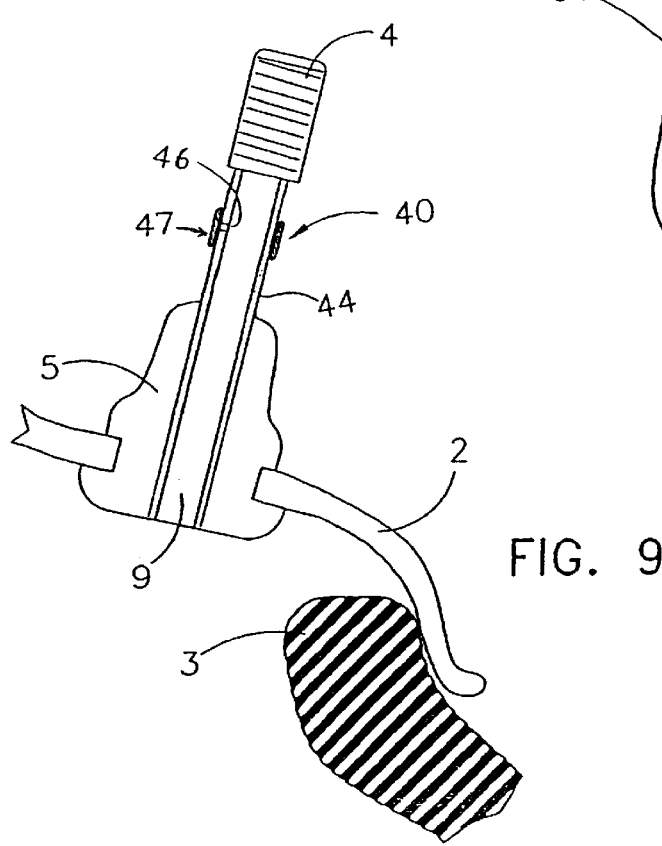
FIG. 9 illustrates a further construction of relief valve in accordance with the present invention.

FIG. 9 illustrates a further arrangement which may be used, in which the relief valve, generally designated 40, is incorporated into the structure of the air valve 4. In the construction illustrated in FIG. 9, the relief valve 40 is applied to the air valve housing 5 adjacent to passageway 9 through the air valve communicating with the interior of the tire 3.

Thus, relief valve 40 includes an opening 46 at the tubular body 44 of the passageway 9 and a valve member 47 made of rubber or other elastomeric material shaped as a belt of initial diameter smaller than the tubular body 44. By placing the elastic belt over the tubular body 44, valve 47 is tightly closing opening 46. In the event of an excessive pressure within the interior of tire 3, the force of the air pressure on opening 46 overcome the elastic pre-stress force of the belt 47 and the valve is automatically opened to vent the excessive pressure to the atmosphere.

Figure 10:
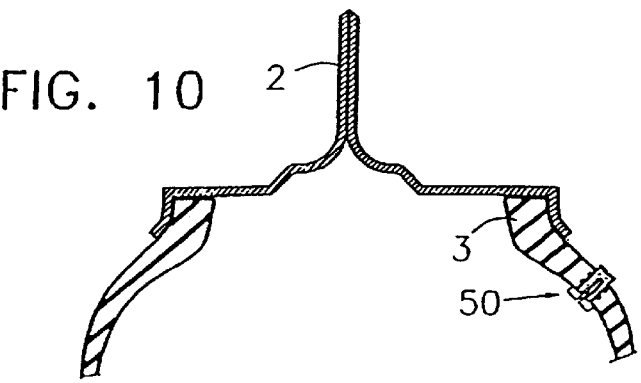
FIGS. 10 and 11 illustrate a still further construction of relief valve in accordance with the present invention.
Figure 11:
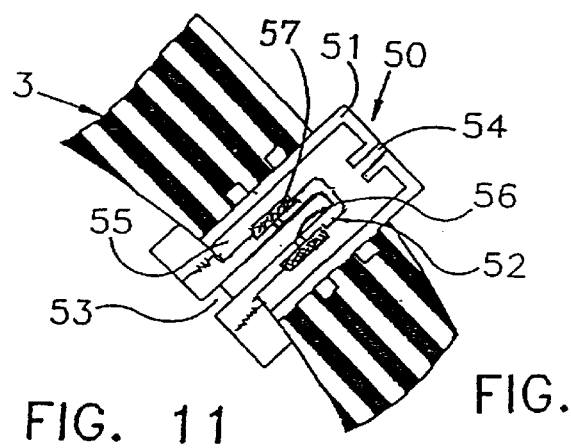

FIGS. 10 and 11 illustrate a relief valve, generally designated 50, applied directly to the tire 3 of the vehicle to release an excessive air pressure therein if necessary. Relief valve 50 includes a cylindrical housing 51 of basically the same construction as described above with respect to FIG. 2, including a passageway 52 having at one end an opening 53 communicating with the interior of the tire, and at the opposite end another opening 54 communicating with the atmosphere. Opening 56 is normally closed by a belt valve member 57 urged by the elastic stress of the belt valve to its closed position, but in the event of an excessive pressure within a tire, belt valve 57 automatically opens to thereby vent the interior of the tire to the atmosphere.

In the construction illustrated in FIGS. 10 and 11 cylindrical housing 51 is mounted in a cylindrical opening formed in the side wall of the tire 3.

Figure 13:
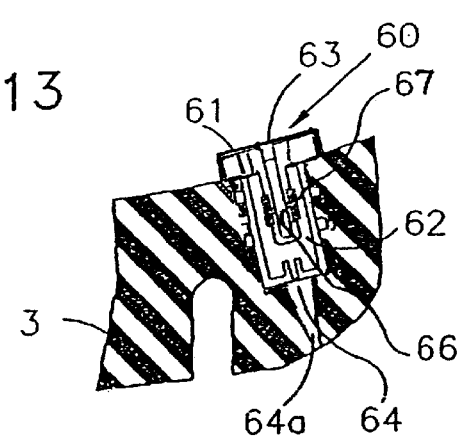
FIGS. 12 and 13 are views, corresponding to those of FIGS. 10 and 11, but illustrating a variation in the construction of the relief valve.
Figure 12:
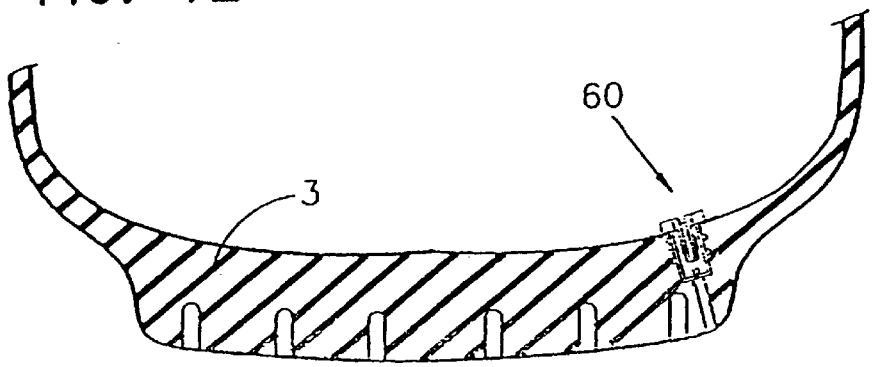

FIGS. 12 and 13 illustrate a similar relief valve, generally designated 60, mounted in the tread of the tire. Relief valve 60 shown in FIGS. 12 and 13 also include a cylindrical housing 61 defining a passageway 62 having an opening 63 at one end communicating with the interior of the tire, and another opening 64 at the opposite end communicating with the atmosphere. Opening 66 is normally closed by a belt valve member 67 urged by a elastic stress of the belt 67, but is automatically opened upon the occurrence of an excessive pressure within tire 3 to thereby vent the excessive pressure to the atmosphere via an opening 64a in the tire tread.

While FIG. 1 illustrates the relief valve 10 mounted on the same side of the tire rim 2 as the air valve 4, it is so shown merely to simplify the drawings. Actually, it would be preferably to mount the relief valve 10 on the opposite side of the air valve 4 for balance purposes. Also while the invention has been described with respect to several preferred embodiments, it will be appreciated that these are set forth merely for purposes of example, and that many other variations, modifications and applications of the invention may be made.

I claim:

1. A vehicle wheel assembly, comprising:
   (a) a tire rim;
   (b) an inflatable tire on said rim;
   (c) an air valve connectable to a source of pressurized air for inflating said tire with pressurized air; and
   (d) a relief valve communicating with the interior of said tire, said relief valve normally being closed but being automatically opened upon the presence of an excessive pressure within said tire to vent the interior of the tire or the source of pressurized air to the atmosphere, said relief valve is in the form of an adapter attachable to the outer end of said air valve to automatically vent the source of pressurized air to the atmosphere upon the presence of said excessive pressure within the tire, said adapter including:
   (i) an adapter housing having a socket at one end for receiving the outer end of the air valve, a socket at the opposite end for receiving the head of an a line connected to said source of pressurized air, and a chamber connecting said two sockets; and
   (ii) a pin in said chamber having one end engageable with said head of the air line and an opposite end engageable with a stem of the air valve, said pin being movable axially of said chamber such that when the head of the air line engages said one end of the pin, it causes the opposite end of the pin to move the stem of the air valve to its open position and thereby to connect the interior of the chamber to the interior of the tire; and a vent in said chamber which is normally closed, but which is automatically opened upon the presence of an excessive pressure within the chamber to thereby vent the interior of the chamber to the atmosphere, said vent including an opening normally intimately covered by a flat belt of elastomeric material being wider than said vent, said flat belt of elastomeric material being bulged and automatically deformed upon the presence of said excessive pressure.

* * * * *